United States Patent Office 3,335,527
Patented Aug. 15, 1967

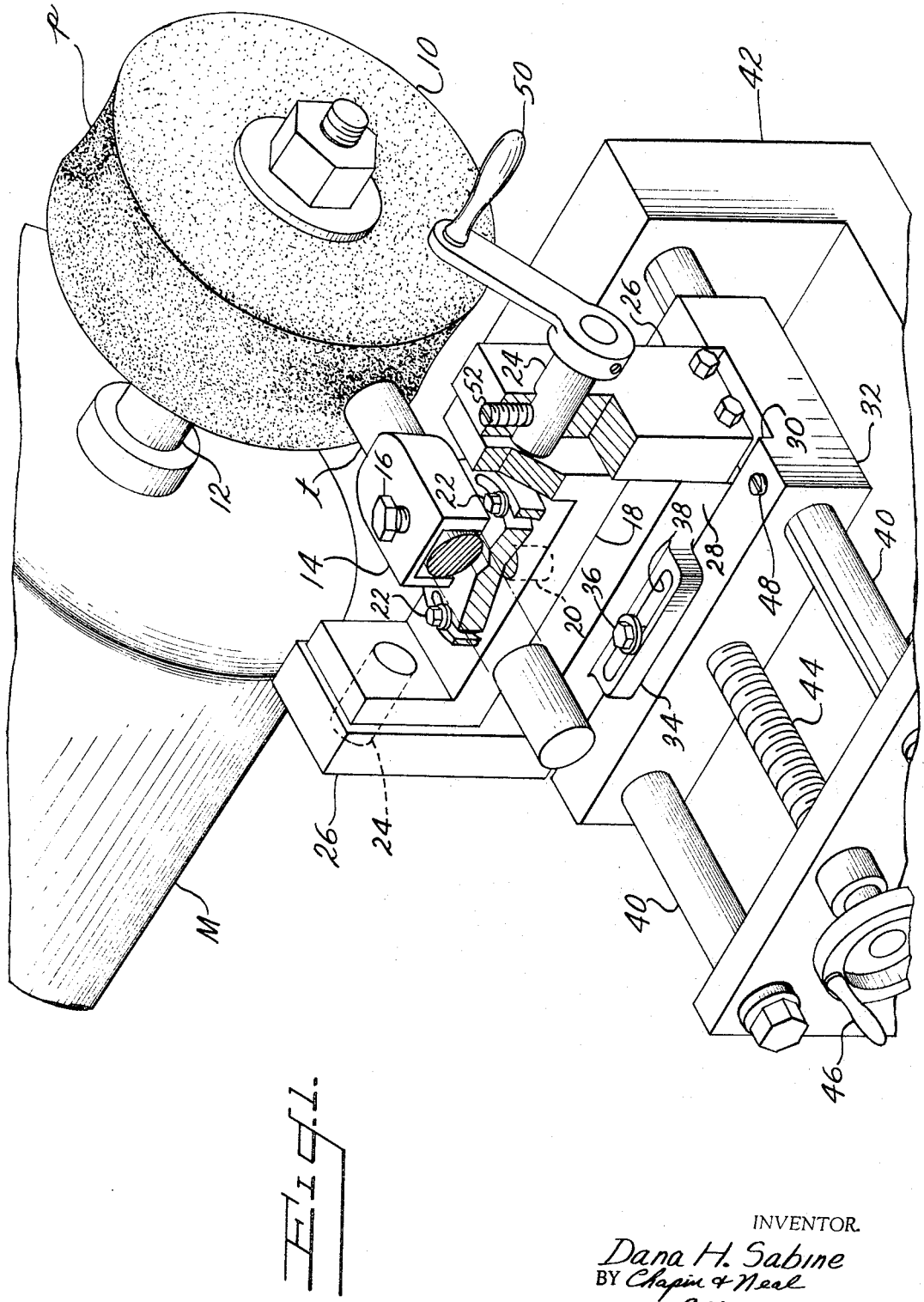

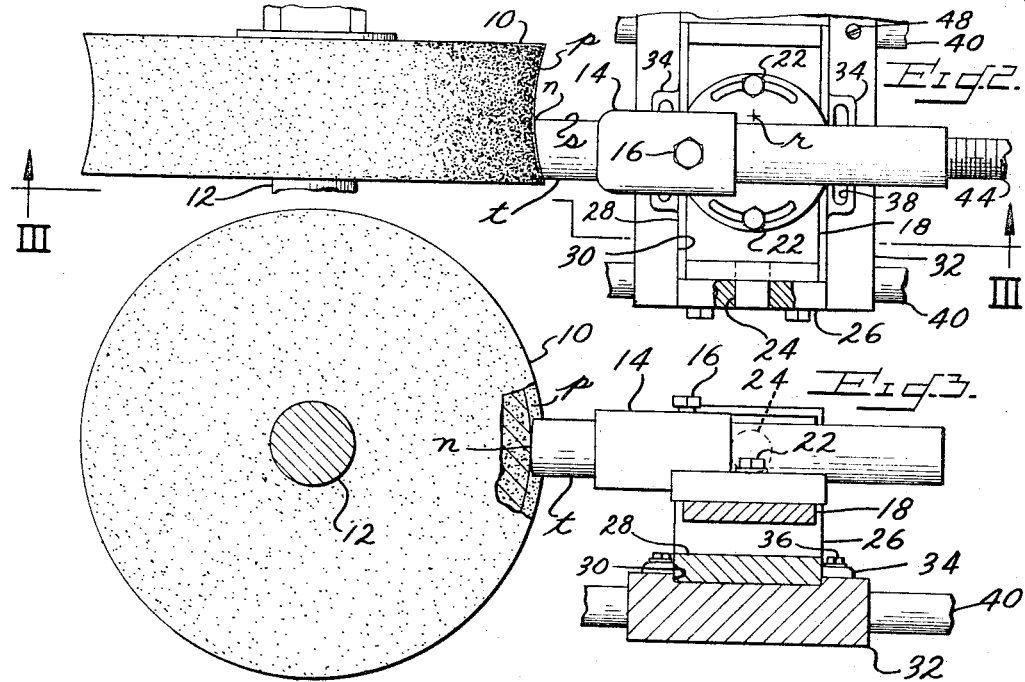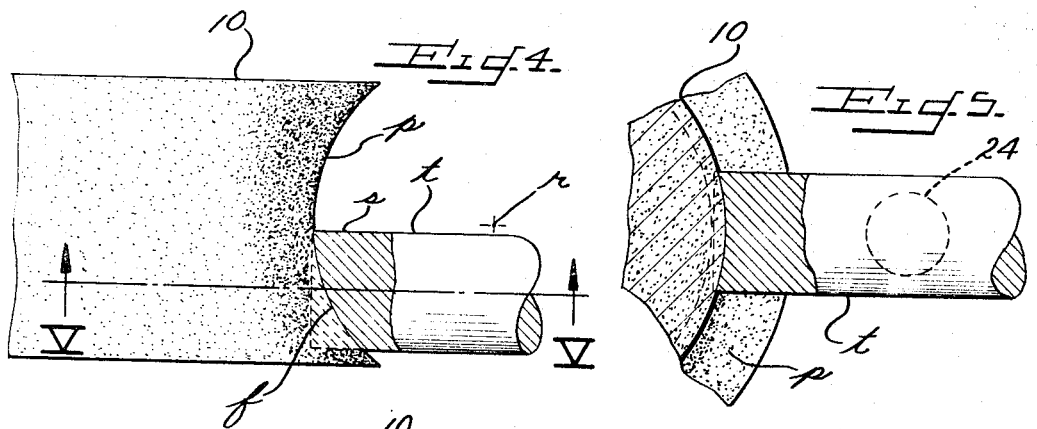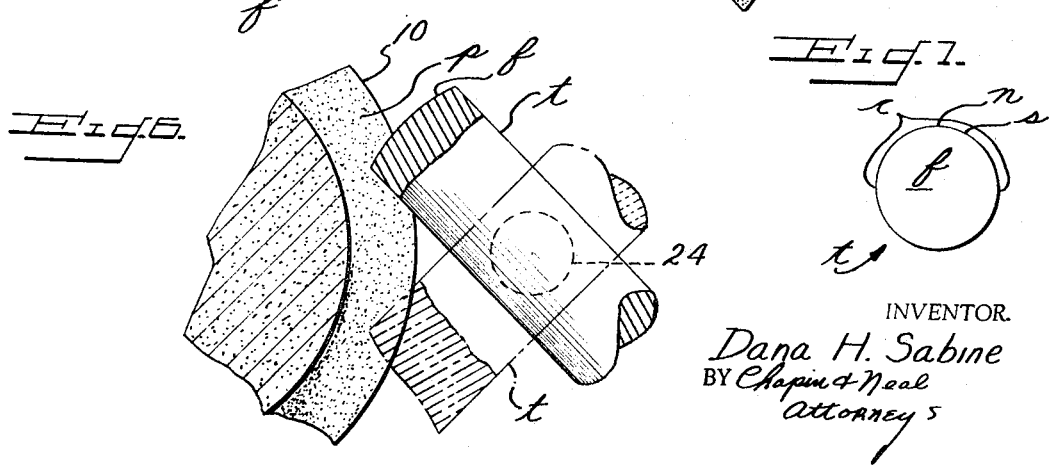

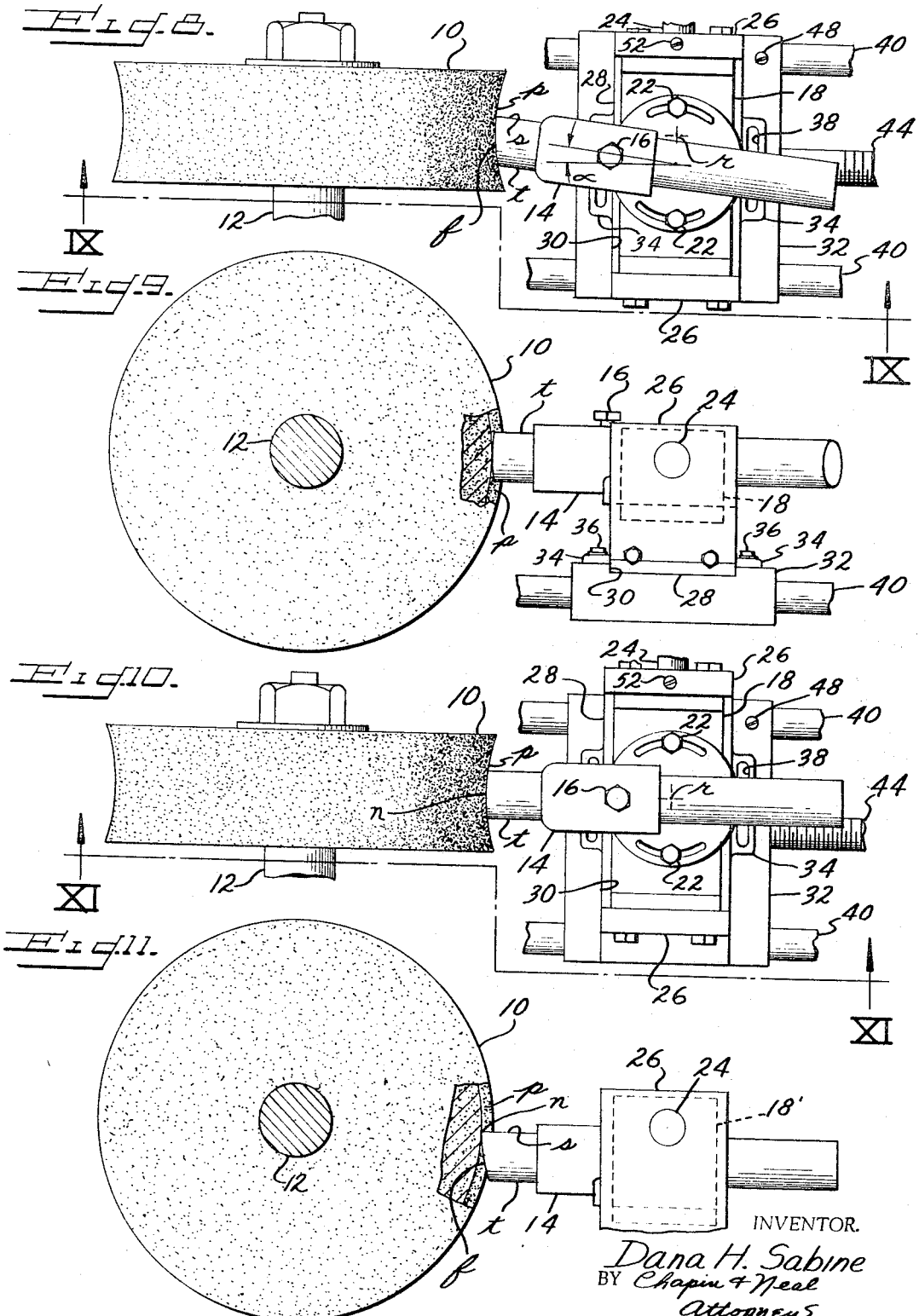

3,335,527
SHARPENING APPARATUS FOR CUTTING TOOLS
Dana H. Sabine, South Burlington, Vt., assignor to Lavallee & Ide, Inc., Chicopee, Mass., a corporation of New York
Filed Oct. 26, 1964, Ser. No. 406,405
6 Claims. (Cl. 51—96)

ABSTRACT OF THE DISCLOSURE

Sharpening apparatus for cutting tools having a cutting edge bounded by a portion of the longitudinal cylindrical surface of the tool and a spherical end face thereof and comprising a grinding wheel with a concave peripheral surface formed from the center of generation spaced outwardly of the wheel and mechanism to hold the tool end face against the concave surface at an angle thereto, said mechanism including a holder locating the longitudinal axis of the tool offset from said center of generation with first pivot means intersecting said center of generation and rotating the tool holder about an axis parallel to the axis of the wheel and second pivot means rotating the holder about an axis normal to the axis of the first pivot means.

---

The present invention relates to improvements in the sharpening of cutting tools and, while not so limited in its broader aspects, finds particular utility in sharpening cutting tools of the type disclosed and claimed in copending application Ser. No. 390,615, filed Aug. 19, 1964, now Patent No. 3,295,186, in the name of Joseph Aime Lavallee.

The object of the invention is to provide simple and improved means for sharpening cutting tools characterized by a cutting edge which is bounded by a compound-convexly curved end face of the tool, particularly as shown in the above-mentioned patent.

These ends are attained in their broader aspects by apparatus comprising a rotatable grinding wheel having a concave peripheral face. Means are employed to position a tool for engagement of its end face with this concave peripheral face, and pivoting the tool about an axis spaced outwardly therefrom and disposed generally parallel to the axis of rotation of the grinding wheel. As the tool is pivoted to pass the end face over the concave peripheral grinding surface, a cutting edge is sharpened on the tool and the end face bounding this cutting edge is compound-convexly curved.

Preferably, and by employing relationships herein set forth, the end face takes the form of a segment of a sphere. It is also preferable that other relationships herein disclosed be employed to provide "relief" of this end face from the cutting edge so that a positive "rake" of the tool may be had when it is used for a cutting operation.

The above and other related objects and features of the invention will be apparent from a reading of the following description of the disclosure found in the accompanying drawings and the novelty thereof pointed out in the appended claims.

In the drawings:

FIG. 1 is a perspective view of a machine embodying the present invention;

FIG. 2 is a fragmentary plan view thereof;

FIG. 3 is a section taken on line III—III in FIG. 2;

FIG. 4 corresponds to FIG. 2, but is on an enlarged scale with certain dimensional relationships exaggerated for illustrative purposes;

FIGS. 5 and 6 are sections taken generally on line V—V in FIG. 4 and showing a tool in various positions as it is sharpened;

FIG. 7 is an end view of a sharpened cutting tool;

FIG. 8 is a fragmentary plan view of an alternate embodiment of the invention;

FIG. 9 is a section taken on line IX—IX in FIG. 8;

FIG. 10 is a fragmentary plan view of another alternate embodiment of the invention; and FIG. 11 is a section taken on line XI—XI in FIG. 10.

While not limited, in its broader aspects, to the sharpening of any particular type of tool, the present invention is advantageously employed in sharpening cutting tools described and claimed in the above-mentioned application. This type of tool comprises an elongated metal member (see FIG. 7 and the full line showing in FIG. 6) having a circular transverse cross section, at least at its outer end. The tool $t$ has a nose $n$ at its outer end and a theoretical cutting edge $c$ extending through 180° of the tool's circumference on opposite sides of the nose $n$.

The cutting edge $c$ is bounded by the longitudinal surface $s$ of the tool and by the end face $f$ thereof. The end face $f$ is characterized in that it has compound-convex shape, preferably spherical. It is also preferable that a tangent from the end face extended beyond the cutting edge forms an obtuse angle, somewhat greater than 90°, with the adjacent portion of the longitudinal surface $s$. In other words, the end face is relieved from the cuttting edge so that a positive rake may be had when the tool is in use.

The present invention is herein described as it would be used in grinding the end face of the tool $t$, just described, to sharpen the cutting edge $c$. The machine seen in FIG. 1 comprises a grinding wheel 10 mounted on the shaft 12 of a motor M which is connected to a power source in conventional fashion. The tool $t$ is positioned for engagement of its end face $f$ with the peripheral face $p$ of the grinding wheel 10, by means which may take the form of an adapter for existing grinding machines or incorporated in a special purpose machine.

These means comprise a tool holder 14 in which the tool $t$ is firmly clamped by a screw 16. The tool holder 14 is mounted on a saddle 18, being angularly adjustable about the axis of a stud 20 which depends therefrom and is pivotally received in the saddle 18. Screws 22 secure the tool holder 14 in adjusted angular position on the saddle 18. The saddle 18 is provided with trunnions 24 which are pivotally received by posts 26. The posts 26 are secured to a slide 28 which is received by a slot 30 in a block 32. Lugs 34 (one is shown in FIG. 1) project from opposite sides of the slide 28 and screws 36 pass through slots 38 therein to firmly hold the slide 28 in adjusted position on the block 32.

The block 32 is slidably mounted on rods 40 which are supported by a bracket 42. This bracket is relatively fixed and may serve as the frame of an adapter where an existing grinding machine is used. The block 32 is adjustable along the rods 40 by means of a lead screw 44 which may be rotated by hand wheel 46. Screw 48 is threaded through block 32 to clamp the latter in adjusted position on the rods 40.

In use, the saddle 18 is pivoted about the axis of the trunnions 24 and to facilitate this movement, a handle 50 is secured to an extension of one of the trunnions. Before describing the operation of this device, further reference will be made to the configuration of the peripheral face $p$ of the grinding wheel 10. For purposes of forming a true spherical surface on the tool $t$, the concave face $p$ is generated by an arc swung from a center $r$ through a plane disposed radially of the axis of rotation of the grinding wheel. Advantageously, the face $p$ may be formed or dressed by substituting in the tool holder 14 a diamond point dressing stone (not shown). By shifting the slide 28 to the right (as viewed in FIG. 1) the axis of stud 20 may be brought to the center r (FIG. 2) to generate or dress the surface p as a true arc. Set screw 52 (FIG. 1) may be tightened to lock the saddle 18 in a position such that the end of the diamond point dressing stone can be swung through a plane extending radially of the axis of shaft 12 upon loosening of the screws 22.

Assuming again that the tool holder 14 is in the position illustrated in FIGS. 1–3, the tool $t$ is traversed over the face $p$ of the wheel 10 by pivoting the holder 14 about the axis of trunnions 24. With the described relationships and with the trunnion axis intersecting the center $r$ (actually the center $r$ defines a circle concentric with the grinding wheel 10) a true spherical surface will be generated on the end face $f$ of the tool $t$.

These relationships are further illustrated by reference to FIGS. 4–6. In FIGS. 4 and 5 it is assumed that the tool $t$ has simply been plunged into the spherical face $p$ of the grinding wheel. Dash lines indicate the material which would be removed if the end of tool $t$ had originally been squared. Next, the tool $t$ is swung downwardly (to the phantom position of FIG. 6) and then upwardly to the full line position wherein the grinding operation is completed and a spherical surface formed on the end of the tool.

In usual practice the tool $t$ however will simply be swung across the peripheral grinding surface $p$ without actually going through the stage illustratively shown in FIGS. 4 and 5.

At this point it will be noted that the length of the radius generating the peripheral face $p$ has been shown as being substantially shortened in FIGS. 4–6. Likewise the diameter of wheel 10 has been substantially reduced. However, so long as the tool $t$ is pivoted about the axis which intersects the center from which the face $p$ has been generated which axis is also parallel to the axis of rotation of the wheel 10, then a true spherical surface will be formed.

If the specified relationship of this axis is varied or if other than a true arcuate (in a radial plane) form is provided on the peripheral face of the grinding wheel, then the end face of the tool will be other than a true sphere. However, so long as the peripheral face $p$ is concave (in a radial plane) the resultant surface formed on the end face of a tool will be compound-convex, and in many instances this will suffice as well.

On the other hand it will be noted that the diameter of the grinding wheel has no effect on the configuration which is formed on the end face of the tool. This means that grinding surface $p$ may be repeatedly dressed without any change necessarily made in the radius of the spherical surface of the end face $f$.

It has previously been indicated that the tool $t$ should preferably be formed with a nose $n$ and with a proper relief of the end face $f$ from the cutting edge $c$. In the embodiment of FIGS. 1–3 (and FIGS. 4–6 as well) this desired result has been obtained by disposing the longitudinal axis intersecting the trunnion or pivot axis and at right angles thereto. The longitudinal surface bounding the cutting edge at nose $n$ is then offset from the center $r$ about which the peripheral face is generated. The nose $n$ is thus formed in a plane radial of the pivot axis with the cutting edge disposed equally on opposite sides of this plane.

The embodiment of FIGS. 8 and 9 is similar in that longitudinal center line or axis of the tool intersects the axis of the trunnions 24. Actually, the structure employed in this embodiment is identical with that previously described (like reference characters are used to identify the parts), the difference between the two embodiments being that the tool holder 14 has been pivoted on stud 20 to the desired rake angle to the tool when in use . . . this angle being about 5° to 10°, as indicated by angle $\alpha$ in FIG. 8. Again the axis of the trunnions 24 intersects the center $r$ from which the peripheral face $p$ of the grinding wheel 10 has been generated.

Operation of this form of the invention is the same as before. Thus, with the tool $t$ firmly clamped in the tool holder 14, the saddle 18 may be pivoted to pass the end face $f$ along the peripheral face $p$ to thereby form a concave spherical surface on the end face $f$. Again the longitudinal surface $s$ is offset to one side of the center $r$ (about which surface $p$ is generated) so that the desired relief is provided from cutting edge $c$ which extends equally on opposite sides of the nose $n$.

The embodiment of FIGS. 10 and 11, with one exception, employs the same structure as in the previous embodiments and like reference characters are used to identify the parts thereof. The exception referred to involves the use of a substitute saddle 18′ which positions the tool holder 14 at a lower level. Also guide 28 has been shifted so that the longitudinal center line of the tool $t$ intersects the center $r$ (for generating the surface $p$) at its point of intersection with the axis of trunnions 24.

Operation of this embodiment is again the same as before. The tool $t$ is clamped in the tool holder 14 and the saddle 18 is pivoted to traverse its end face $f$ along the grinding surface $p$ to form a spherical shape thereon.

In this embodiment the desired nose $n$ and relief from the cutting edge $c$ is provided by dropping the longitudinal surface $s$, defining the cutting edge $c$ at nose $n$, below the pivot axes, i.e. the axis of trunnion 24. It will be seen that the nose $n$ is thus formed at the top of the end face $f$ and the cutting edge $c$ extends downwardly from opposite sides thereof.

While the invention has been described in connection with the shapening of "single point" cutting tools, it is also adaptable to sharpening other cutting tool such as drills and reamers as well. This and other modifications of the invention will be apparent to those skilled in the art and the scope of the inventive concepts herein disclosed is thus to be measured by the following claims.

Having thus described the invention what is claimed as novel and desired to be secured by Letters Patent of the United States is:

1. Apparatus for sharpening a cutting tool of the type comprising an elongated metal cylinder to form a cutting edge bounded by a portion of the longitudinal cylindrical surface of the tool and the end face thereof, comprising,
    a rotatable grinding wheel having a concave peripheral surface generated by a radius swung from a center spaced outwardly of the wheel and lying in a plane disposed radially of the axis of rotation of said wheel and
    mechanism for holding the tool for engagement of the end face thereof with the peripheral surface of the grinding wheel and forming a compound-convexly curved end face relieved from said tool cutting edge, said mechanism comprising
        a tool holder member,
        and means for disposing the longitudinal axis of the tool in said holder in offset spaced relation to said center of generation and presenting the end face thereof against the wheel surface to form a desired rake angle, including,
            first pivot means for rotating said holder about an axis parallel to the axis of the wheel,
            second pivot means carried by said first pivot means to rotatably move said holder about an axis perpendicular to said parallel axis, the said axis of the first pivot means intersecting said center of generation of said concave peripheral wheel surface.

2. The apparatus of claim 1 in which the axis of said first pivot means also intersects both the longitudinal axis of the tool mounted in said holder and the axis of said second pivot means.

3. Apparatus for sharpening a cutting tool, of the type comprising an elongated metal cylinder, to form a cutting edge bounded by a portion of the longitudinal cylindrical surface of the tool and the end face thereof, said apparatus comprising a rotatable grinding wheel having an arcuate peripheral surface generated by a radius swung from a center spaced outwardly of the wheel and through a plane disposed radially of the axis of rotation of said wheel, a tool holder in which the tool is clamped with its end face directed towards said peripheral surface for engagement therewith, a saddle on which said tool holder is mounted, a slide having upright spaced posts between which the saddle is disposed, trunnion means mounting said saddle on said posts for pivotal movement thereof, said trunnion axis being parallel to the axis of rotation of said wheel, said tool holder being angularly adjustable on said saddle about an axis extending radially of the trunnion axis, a block having a guideway receiving said slide for adjustment thereof longitudinally of the axis of said wheel, means for clamping said slide in adjusted position along the length of said guideway and means for adjusting said block towards and away from said grinding wheel whereby the end face of the tool may be pivoted along the peripheral surface of the grinding wheel to form a cutting edge bounded by a compound-convexly curved end face.

4. Apparatus as in claim 3 wherein the trunnion axis intersects said center of generation and the tool holder disposes the longitudinal axis of the tool normal to and intersecting the trunnion axis and further disposes said longitudinal surface in closely spaced relation from said center of generation whereby the end face of the tool is spherical and relieved from the cutting edge thereof.

5. Apparatus as in claim 3 wherein the trunnion axis intersects said center of generation and the tool holder disposes the longitudinal axis of the tool intersecting the trunnion axis and at an angle of about 5°–10° from a normal relation to said trunnion axis and further disposes said longitudinal surface in closely spaced relation from said center of generation whereby the end face of the tool is spherical and relieved from the cutting edge thereof.

6. Apparatus as in claim 3 wherein the trunnion axis intersects said center of generation and said tool holder disposes the longitudinal axis of the tool in a plane normal to said axis of rotation and intersecting said center of generation and further disposes said longitudinal surface of the tool in closely spaced relation from said trunnion axis whereby the end face of the tool is spherical and relieved from the cutting edge thereof.

References Cited

UNITED STATES PATENTS

| 1,599,405 | 9/1926 | Bugbee | 51—96 |
| 2,359,411 | 10/1944 | Enberg | 125—11 |
| 2,780,894 | 2/1957 | Jensch | 51—96 |
| 2,805,523 | 9/1957 | Springer | 51—102 |

FOREIGN PATENTS 342,922  2/1931  Great Britain.

ROBERT C. RIORDON, *Primary Examiner.*

D. G. KELLY, *Assistant Examiner.*